(No Model.)
R. C. ANDERSEN.
DEVICE FOR WATERING STOCK.
No. 474,621. Patented May 10, 1892.
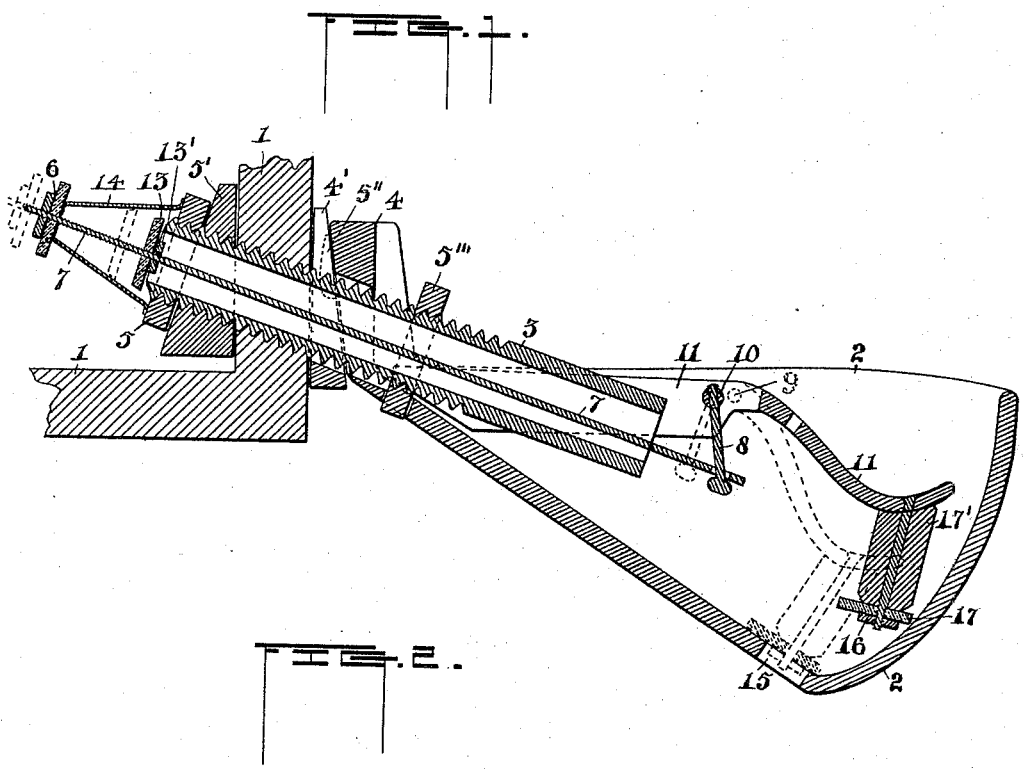
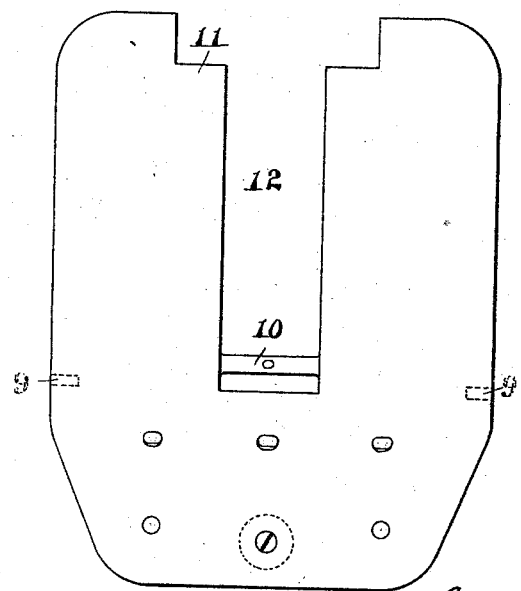
WITNESSES
Arch. M. Catlin.
David Borden.
INVENTOR
Richard C. Andersen
by
Benj. R. Catlin
atty

UNITED STATES PATENT OFFICE.

RICHARD C. ANDERSEN, OF PAWNEE CITY, NEBRASKA.

DEVICE FOR WATERING STOCK.

SPECIFICATION forming part of Letters Patent No. 474,621, dated May 10, 1892.

Application filed September 19, 1891. Serial No. 406,164. (No model.)

*To all whom it may concern:*

Be it known that I, RICHARD C. ANDERSEN, a resident of Pawnee City, in the county of Pawnee and State of Nebraska, have invented certain new and useful Improvements in Devices for Watering Stock; and I do hereby declare the following to be a full, clear, and exact description of the invention, such as will enable others skilled in the art to which it pertains to make and use the same.

The invention relates to devices for supplying a trough with water adapted to be operated by the animal desiring drink; and it has for its object to cut off the supply of water under certain conditions while the animal is drinking, and to provide for letting out of the trough all water that is left after the animal has drank.

It consists in the construction hereinafter described, and particularly pointed out in the claims.

In the accompanying drawings, Figure 1 is a central longitudinal section, and Fig. 2 is a plan of a detail.

Numeral 1 indicates a section of the wall of a tank or water-holder, and 2 a watering-trough.

3 denotes a supply-pipe leading from the tank to the trough. It is preferably screw-threaded on its exterior and is passed through the tank-wall and secured therein, the joint being made water-tight in usual manner. When placed in operative position, the rear wall 4 of the trough 2 bears on the exterior of the tank-wall or against a wedge or washer 4', and the nut 5 is screwed up against the inside of the tank or against a wedge 5', whereby it is held in position upon the tank near its bottom.

5" indicates one of two or more projections, which are adapted to be pressed or fitted into the tank-wall or into an interposed bearing-piece. They aid in holding the trough in a fixed position and prevent its rotation either on or with pipe 3.

5''' indicates a nut whereby the trough may be forced against the tank. So far as respects the holding of the parts together, it is not necessary that both nuts 5 and 5''' be screw-threaded or movable on the pipe.

The wall of the tank may be vertical or inclined, and pipe 3 may be inclined or horizontal, and the wedges above referred to can be used or not, as convenience under particular circumstances may determine. It is preferred, however, that the trough shall be shaped and applied in such manner that it will not overflow until the water-level nearly reaches its front upper edge.

6 denotes a valve adapted normally to close the inlet-mouth of the trough-supplying pipe. It is made in any approved form and is preferably faced with leather or other elastic material, and is secured upon a rod 7, which extends through the outlet-pipe longitudinally. Within the trough said rod is loosely connected to an operating-arm 8, which arm is rigidly attached to a pivoted platform 11 and by preference to a bar 10, attached to said platform. The tilting platform 11 has detachable bearings in the side walls of the trough at 9. Said platform has a slot 12 in its end next the barrel or tank, which slot permits this end to embrace the pipe and tilt freely on its shaft-bearings. Said inner slotted end of the platform is made heavier than its outer end to provide that the valve shall be normally closed by the platform through the medium of the arm 8 and rod 7.

In operation the valve is opened by pressure on the outer end of the platform, which depresses it and turns its shaft, with the effect to swing the lower end of arm 8 inwardly, thereby pushing rod 7 and opening the valve. This effect is produced by the foot or nose of the animal. When the pressure is removed, the platform closes the valve by gravity.

To obviate too-prolonged flow and waste of water, which may happen, and especially when an animal like a hog puts his foot in the trough, I provide a subsidiary cut-off valve 13, so situated on rod 7 that it will close or partially close the outlet whenever the outer end of the platform is at its lowest position. If the pipe-inlet 14 be made conical, as represented, this valve will partially obstruct the outflow of water before its extreme position is reached, so that it has an effect to check the supply, even though it be not entirely closed, and it would be practicable to so locate the valve 13 that the water supply should never be entirely cut off by the animal acting on the platform. The relative position of valve 13 can be varied either by turning nut 13' or by moving inlet-pipe 14 by means of its attached nut 5.

The trough is primarily intended for swine and other stock of small size, and as there is considerable pressure in the tank it will be practicable to make the tube 14 large and long enough so that sufficient water will be forced into the trough during the brief interval between the opening of valve 6 and the closing of valve 13 to satisfy the thirst of the animal. Should the quantity be too small, the animal will readily learn to operate the valves a second or third time. If for any reason, as in case of large stock to be watered but once or twice a day, it be desirable to supply a large quantity of water, the valve 13 can be so located and proportioned as not to entirely arrest the flow of water, as above stated.

To provide for the escape of the water left after the animal has drank, a valved outlet 15 is placed in the bottom of the trough. This is normally open, but is adapted to be closed by the valve 16 when the outer end of the platform is depressed and water let into the trough as above described. By preference this valve, which is secured to and movable with the platform, has a flexible part or diaphragm 17, considerably larger than the outlet and attached to and carried by a stem or plug 17', which, if desired, may be conical and adapted to push the central part of the flexible valve into the outlet. Said flexible valve, however, will practically close the outlet before its extreme position is reached, an effect similar to that of a spring-supported valve being thus attained. In summer, if desired, this valve can be removed from the platform and a plug fixed in the opening 15.

I am aware that a watering-trough has been supplied with a tilting platform adapted to operate a valve in the water-supply pipe, the valve-stem being loosely connected to the platform by a link, which is dispensed with in my improvement. I also secure other material advantages by devices unknown in such combinations prior to my invention.

Having now described the nature of my invention, what I desire to secure by Letters Patent is—

1. The watering-trough provided with a movable platform, the tank, the pipe whereby they may communicate, the cut-off valve for said pipe adapted to be opened by a movement of the platform, and a cut-off valve in said pipe adapted to be closed by the same movement of the platform, all combined substantially as set forth.

2. A watering-trough provided with a movable platform and with an outlet in its bottom, a water-holding tank, a pipe by which the trough and tank may communicate, a valve for said pipe normally closed, and a valve adapted to be operated by the movement of the platform to close said outlet when the first-named valve is opened to permit water to flow into the trough, substantially as set forth.

3. A watering-trough having an outlet normally open, a movable platform located in said trough, and a valve adapted to be operated by the platform whereby the depression of said platform within the trough closes the outlet, substantially as set forth.

In testimony whereof I have signed this specification in the presence of two subscribing witnesses.

RICHARD C. ANDERSEN.

Witnesses:
    D. D. DAVIS,
    L. L. BULL.